United States Patent
Varghese (10) Patent No.: US 11,941,459 B2
(45) Date of Patent: Mar. 26, 2024

(54) INTEGRATING APPLICATIONS USING CONTAINERIZED INTEGRATION FLOW

(71) Applicant: SAP SE, Walldorf (DE)

(72) Inventor: Sherwin Varghese, Kochi (IN)

(73) Assignee: SAP SE, Walldorf (DE)

( * ) Notice: Subject to any disclaimer, the term of this patent is extended or adjusted under 35 U.S.C. 154(b) by 149 days.

(21) Appl. No.: 17/464,277

(22) Filed: Sep. 1, 2021

(65) Prior Publication Data

US 2023/0067833 A1 Mar. 2, 2023

(51) Int. Cl.
*G06F 9/54* (2006.01)
*G06F 3/0486* (2013.01)
*G06F 8/34* (2018.01)
*G06F 8/61* (2018.01)

(52) U.S. Cl.
CPC ............ *G06F 9/541* (2013.01); *G06F 3/0486* (2013.01); *G06F 8/34* (2013.01); *G06F 8/63* (2013.01)

(58) Field of Classification Search
CPC .......... G06F 9/541; G06F 3/0486; G06F 8/34; G06F 8/63
See application file for complete search history.

(56) References Cited

U.S. PATENT DOCUMENTS

| | | | | |
|---|---|---|---|---|
| 2004/0049481 A1* | 3/2004 | Blevins | .................. | G06Q 10/06 |
| 2005/0251533 A1* | 11/2005 | Harken | ................. | G06F 40/143 |
| 2006/0005204 A1* | 1/2006 | Siegel | ..................... | G06F 9/541 |
| | | | | 719/313 |
| 2006/0156314 A1* | 7/2006 | Waldorf | ................ | G06F 9/4484 |
| | | | | 712/E9.082 |
| 2006/0172427 A1* | 8/2006 | Germouni | .............. | C25D 21/14 |
| | | | | 436/55 |
| 2006/0230314 A1* | 10/2006 | Sanjar | ....................... | G06F 8/61 |
| | | | | 714/26 |
| 2006/0259499 A1* | 11/2006 | Moulckers | ............ | G06F 40/186 |
| | | | | 715/764 |
| 2012/0209947 A1* | 8/2012 | Glaser | ................... | G06F 9/5027 |
| | | | | 709/217 |
| 2012/0226737 A1* | 9/2012 | Rajaraman | .......... | G06F 9/44526 |
| | | | | 717/115 |

(Continued)

*Primary Examiner* — Tuan C Dao
(74) *Attorney, Agent, or Firm* — SCHWEGMAN LUNDBERG & WOESSNER, P.A.

(57) ABSTRACT

Techniques for integrating applications using a container image of an integration flow are disclosed. In some embodiments, a computer system performs operations comprising: providing a low-code no-code (LCNC) development platform to a computing device, the LCNC development platform being configured to enable a user to develop an integration flow; receiving a configuration of the integration flow from the computing device via the LCNC development platform, the integration flow being configured to enable communication between a first application being hosted on a first system and a second application being hosted on a second system; building a container image of the integration flow based on the configuration of the integration flow, the container image being configured to execute the integration flow; and deploying the container image of the integration flow on the second system, the deployed container image of the integration flow enabling communication between the first application and the second application.

18 Claims, 9 Drawing Sheets

(56) References Cited

U.S. PATENT DOCUMENTS

| | | | |
|---|---|---|---|
| 2013/0227573 A1* | 8/2013 | Morsi | G06F 9/5083 |
| | | | 718/100 |
| 2014/0172194 A1* | 6/2014 | Levien | G05D 1/0027 |
| | | | 701/2 |
| 2017/0171049 A1* | 6/2017 | Kriegesmann | H04L 67/1097 |
| 2020/0241875 A1* | 7/2020 | Chen | G06F 9/544 |
| 2021/0203713 A1* | 7/2021 | Broddle | H04L 67/06 |

* cited by examiner

CHANGE ORGANIZATION: 8000000169

BUSINESS PARTNER [ 8000000169 ]

CHANGE IN BP ROLE [ BUSINESS PARTNER (GEN.) ⌄ ]

<u>ADDRESS</u>  ADDRESS OVERVIEW  IDENTIFICATION  CONTROL  PAYMENT TRANSACTIONS  STATUS

NAME

TITLE [ COMPANY ⌄ ]

NAME [ SAP SE GERMANY ] ~410

STANDARD ADDRESS

STREET/HOUSE # [ 123141 ]

POSTAL CODE/CITY [ 12334 ]

COUNTRY [ DE ] [ GERMANY ]  REGION [ 07 ] [ RHINELAND PALATINATE ]

INTEGRATING APPLICATIONS USING CONTAINERIZED INTEGRATION FLOW

BACKGROUND

Software applications may be integrated to make the applications communicate with each other by exchanging data and invoking services that they offer. An integration flow may be deployed to enable communication between the different applications.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Current solutions for integrating applications, such as an on-premise application that is hosted on an on-premise system and a cloud application that is hosted on an external cloud system, involve deploying the integration flow on the on-premise system, which causes technical problems. For example, from the perspective of a user who does not own the on-premise system, but has a dedicated tenant on which the cloud application runs, executing the integration flow on the on-premise system raises a data security issue, as the user's data may be undesirably exposed to the on-premise system over which the user does not have control. Additionally, executing the integration flow on the on-premise system involves significant network calls, resulting in excessive consumption of network bandwidth and slowing down the integration process and other computer operations. In addition to the issues discussed above, other technical problems may arise as well Example methods and systems for integrating a first application (e.g., an on-premise application being hosted on an on-premise system) and a second application (e.g., a cloud application being hosted on a cloud system) are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to integrate applications using a container image of an integration flow.

In some example embodiments, the computer system provides a low-code no-code (LCNC) development platform to a computing device, where the LCNC development platform is configured to enable a user of the computing device to develop an integration flow by using a graphical user interface (GUI) of the LCNC development platform to drag and drop components of the integration flow. The computer system may receive a configuration of the integration flow from the computing device via the LCNC development platform, where the integration flow is configured to enable communication between a first application being hosted on a first system and a second application being hosted on a second system. Next, the computer system may build a container image of the integration flow based on the configuration of the integration flow, with the container image being configured to execute the integration flow. The computer system may then deploy the container image of the integration flow on the second system, with the deployed container image of the integration flow enabling communication between the first application and the second application.

By deploying and executing the integration flow on the second system rather than on the first system, as disclosed herein, the techniques disclosed in the present disclosure avoids exposing the user's data to the first system and also reduces the amount of network calls, thereby improving data security, reducing the consumption of network bandwidth, and speeding up the integration process and other computer operations. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
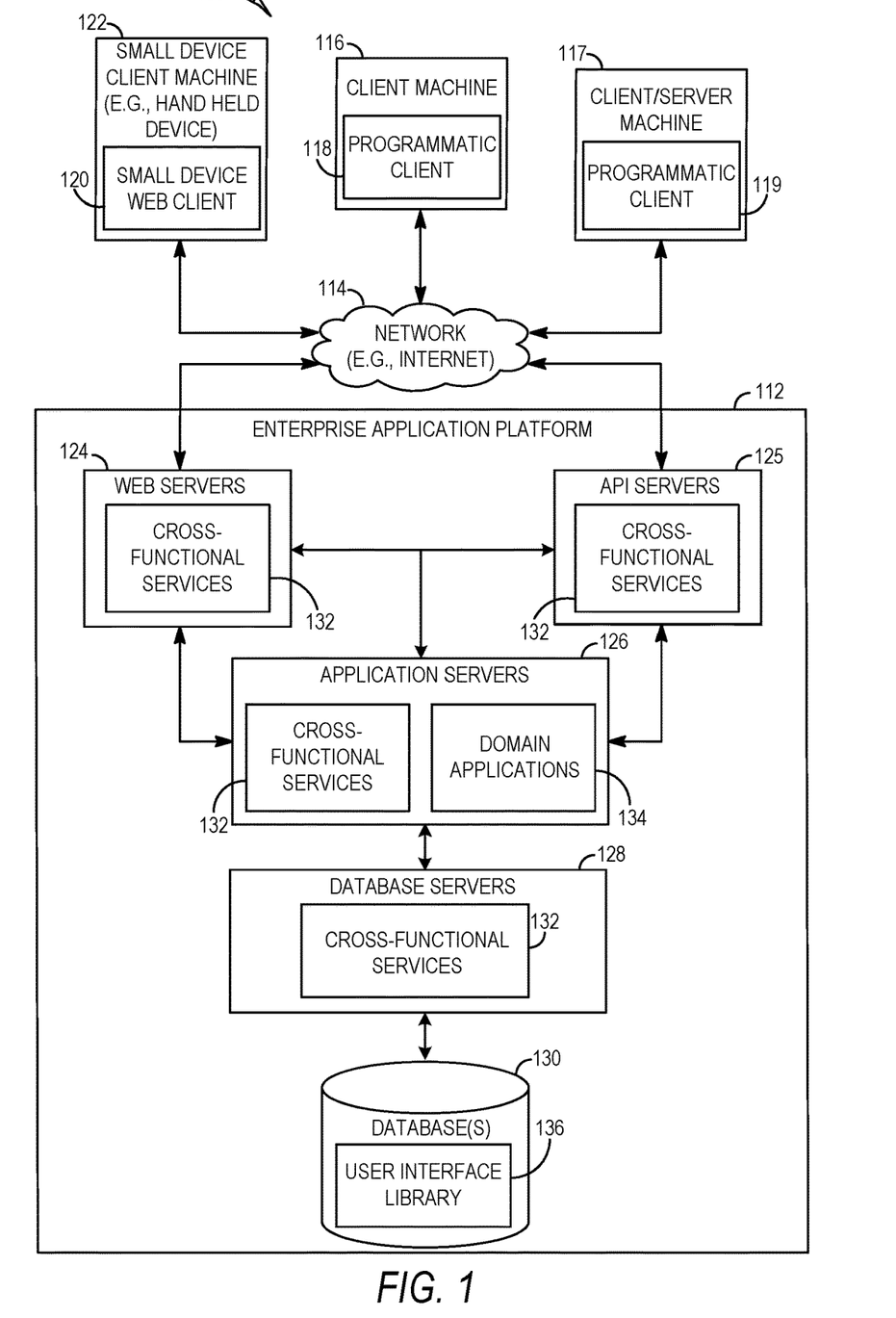
FIG. 1 is an example network diagram illustrating a system.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and API servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
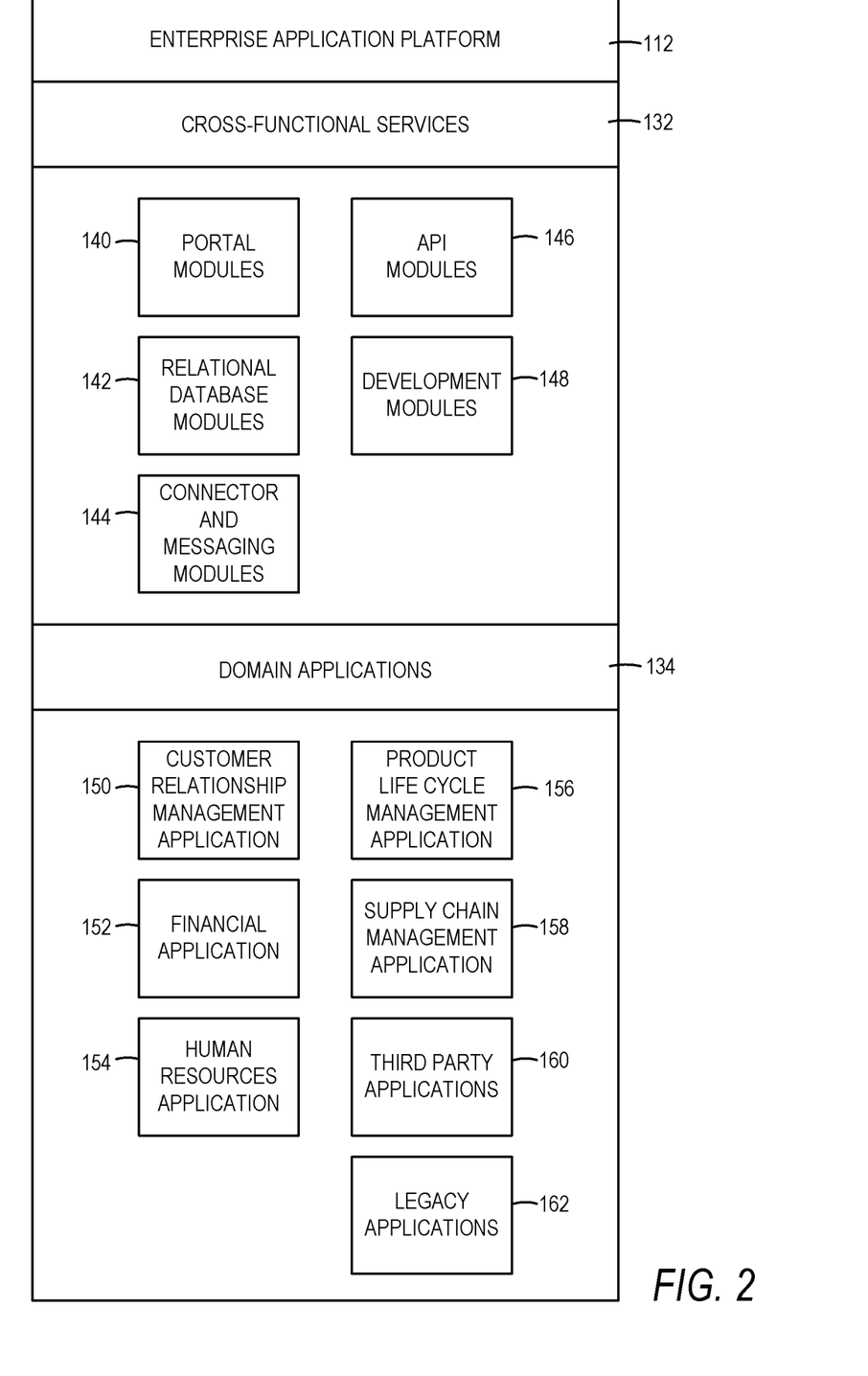
FIG. 2 is a block diagram illustrating example enterprise applications and services in an enterprise application platform.

FIG. 2 is a block diagram illustrating example enterprise applications and services in an enterprise application platform 112. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
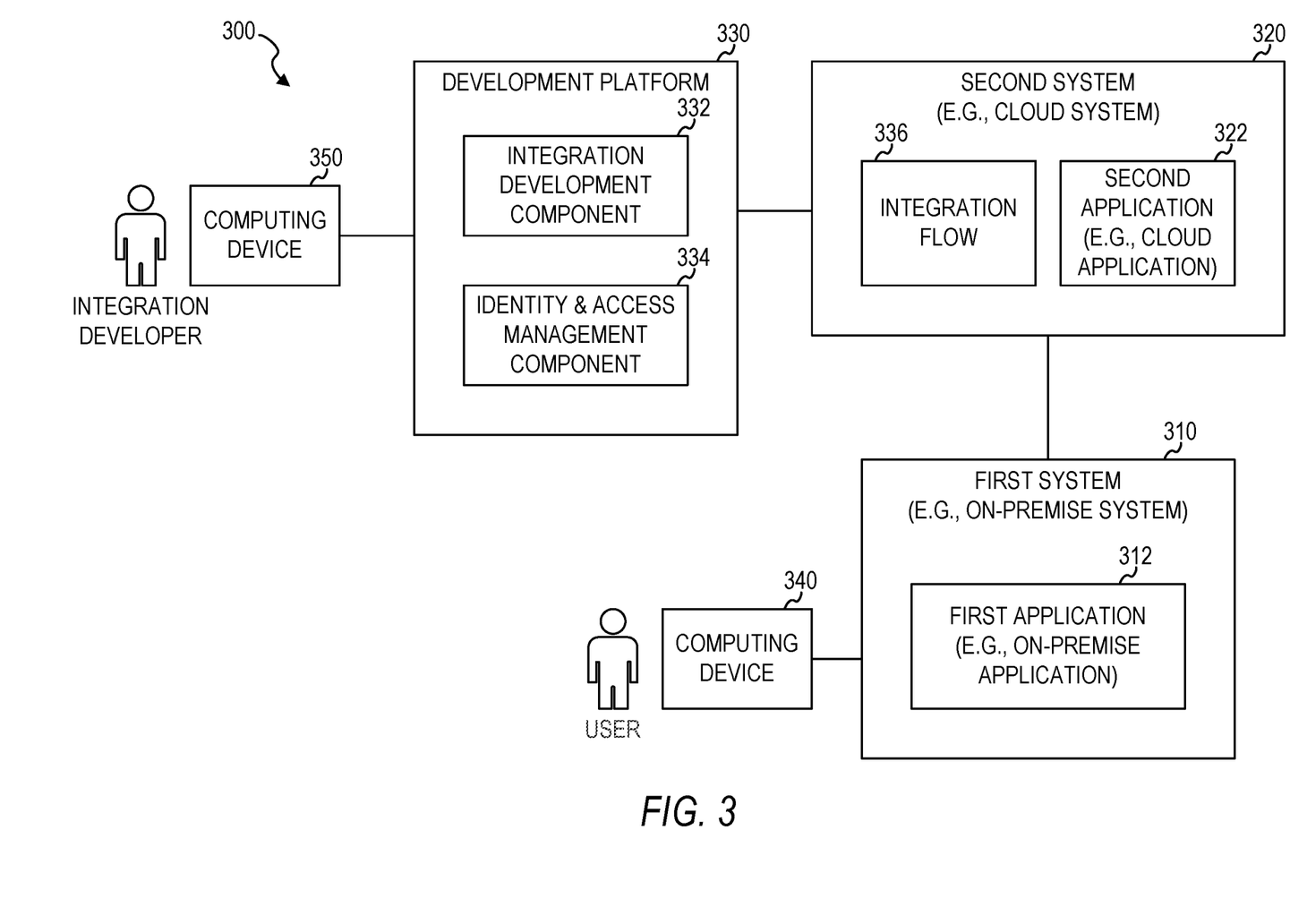
FIG. 3 is a block diagram illustrating an example system architecture for integrating a first application and a second application.

FIG. 3 is a block diagram illustrating an example system architecture 300 for integrating a first application 312 and a second application 322. In some example embodiments, the system architecture 300 comprises a first system 310 that hosts the first application 312, a second system 320 that hosts the second application 322, and a development platform 330. The first system 310 and the second system 320 can each comprise a respective computer system, or other machine, having a memory and at least one processor (not shown). The development platform 330 may be implemented on a cloud system different from the second system 320 or may be implemented on and incorporated into the first system 310. In some embodiments, one or more of the first system 310, the second system 320, and the development platform 330 are incorporated into the enterprise application platform 112 in FIGS. 1 and 2. However, it is contemplated that other configurations of the first system 310, the second system 320, and the development platform 330 are also within the scope of the present disclosure.

In some example embodiments, one or more of the first application 312, the second application 322, and the development platform 330 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input. In some example embodiments, one or more of the first application 312, the second application 322, and the development platform 330 are configured to receive user input. For example, one or more of the first application 312, the second application 322, and the development platform 330 can present one or more graphical user interface (GUI) elements (e.g., drop-down menu, selectable buttons, text field) with which a user can submit input. In some example embodiments, one or more of the first application 312, the second application 322, and the development platform 330 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the first system 310 comprises an on-premise system that includes an on-premise data center on which the first application 312 (e.g., an on-premise application) is hosted, and the second system 320 comprises a cloud system that includes a cloud data center on which the second application 322 (e.g., a cloud application) is hosted. In other example embodiments, the first system 310 comprises a first on-premise system on which the first application 312 (e.g., a first on-premise application) is hosted, and the second system 320 comprises a second on-premise system that is different from the first on-premise system and on which the second application 322 (e.g., a second on-premise application) is hosted. In other example embodiments, the first system 310 comprises a first cloud system on which the first application 312 (e.g., a first cloud application) is hosted, and the second system 320 comprises a second cloud system that is different from the first cloud system and on which the second application 322 (e.g., a second cloud application) is hosted. The second system 320 is external to and independent of the first system 310. In some example embodiments, the first system 310 has a first data model that provides the definition and format of its data, and the cloud system has a second data model that provides the definition and format of its data. The second data model is different from the first data model.

In some example embodiments, the first application 312 is configured to be used by a user of a computing device 340 that has access to the first application 312. The first application 312 may comprise an on-premise application that is installed and run on computers on the premises of the person or organization using the first application 312, rather than at a remote facility such as a server farm or cloud. The first application 312 may comprise database and modules that are combined to particularly serve the unique needs of an organization regarding the automation of a corporate-wide business system and its functions. Alternatively, the first application 312 may comprise a cloud application. In some example embodiments, the first application 312 comprises an enterprise resource planning (ERP) application. The ERP application may comprise a suite of integrated applications that an organization can use to collect, store, manage, and interpret data from many business activities.

An organization may want to integrate the first application 312 with the second application 322 to enable communication between the first application 312 and the second application 322. For example, the second application 322 may comprise a field service management application that manages an organization's resources, such as resources that have been employed at or en route to the property of customers or clients, and the organization may want to enable communication between the ERP application of the first application 312 and the field service management application of the second application 322. By integrating the ERP application of the first application 312 and the field service management application of the second application 322, data that is input or created via the first application 312 may be available for use by the second application 322, and data that is input or created via the second application 322 may be available for use by the first application 312.

Figure 4:
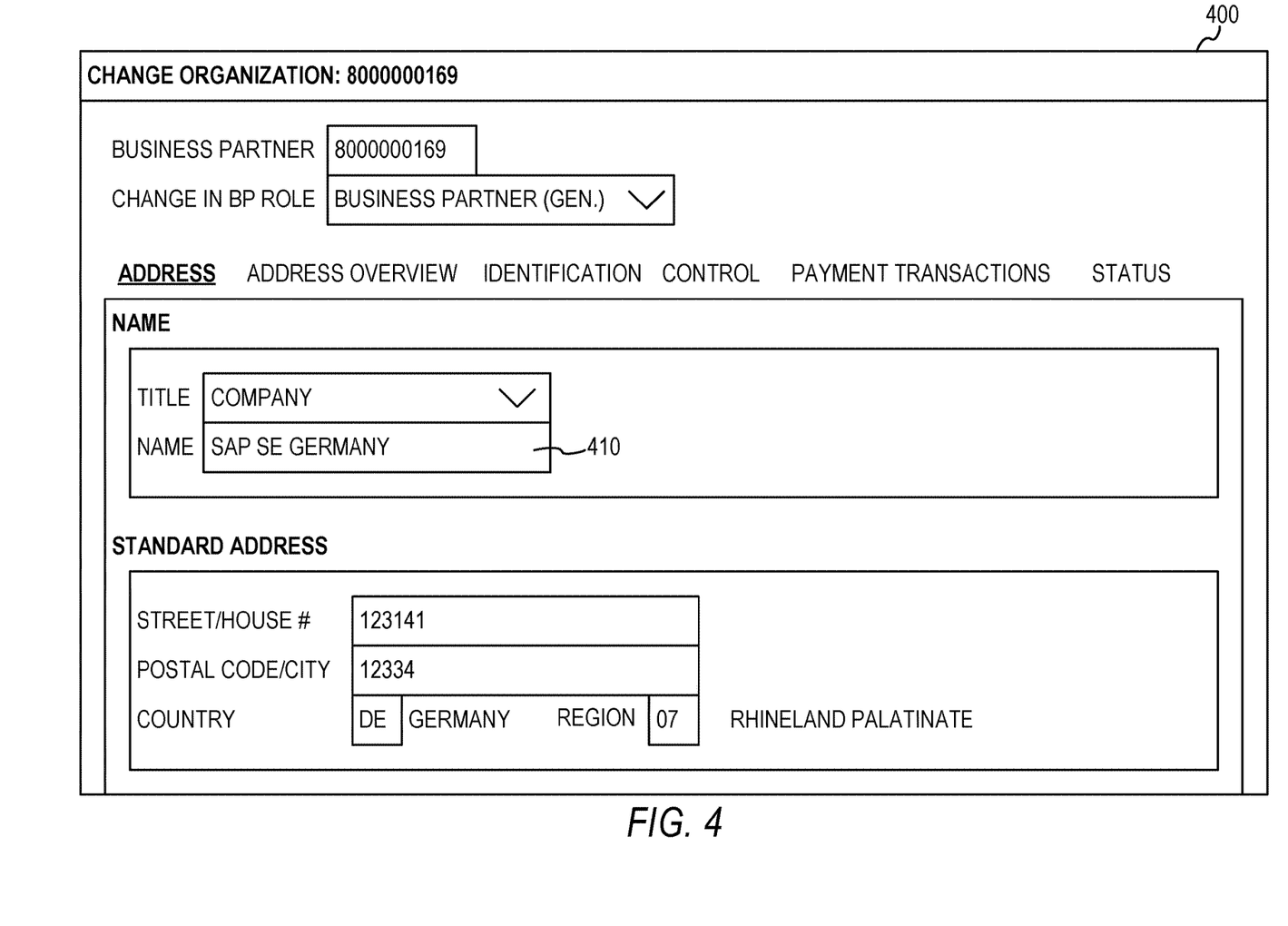
FIG. 4 illustrates an example graphical user interface (GUI) of a first application.
Figure 5:
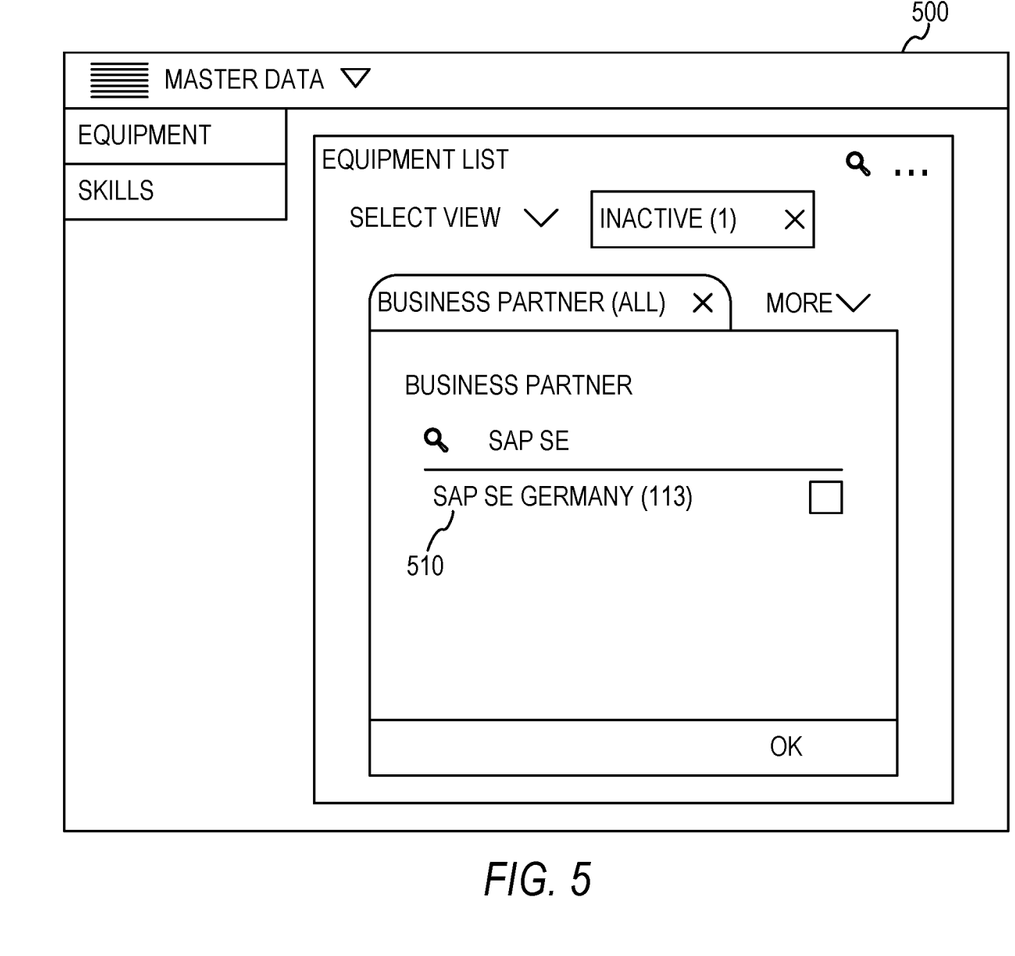
FIG. 5 illustrates an example GUI of a second application.

FIG. 4 illustrates an example graphical user interface (GUI) 400 of the first application 312. FIG. 5 illustrates an example GUI 500 of the second application 322. In one example, when the first application 312 and the second application 322 are integrated so as to enable communication between the first application 312 and the second application 322, data that is entered and created by the user via the GUI 400 of the first application 312 may then be accessible via the GUI 500 of the second application 322. For example, in FIG. 4, the user is using the GUI 400 of the first application 312 to create a business partner having the name "SAP SE GERMANY," such as by entering "SAP SE GERMANY" into a field 410 and using one or more other user interface elements of the GUI 400. Once the business partner is created via the GUI 400, the created business partner "SAP SE GERMANY" is then available for use in the GUI 500 of the cloud application, such as by a user interface element 510 that corresponds to the created business partner "SAP SE GERMANY."

In some example embodiments, the development platform 330 is configured to enable a user of a computing device 350, such as an integration developer, to develop an integration flow 336 for integrating the first application 312 and the second application 322 to enable communication between the two. The development platform 330 may comprise an integration development component 332 with which the integration developer interacts to configure the integration flow 336. In some example embodiment, the integration development component 332 comprises a low-code no-code (LCNC) development platform that is configured to enable the integration developer to develop an integration flow 336 by using a graphical user interface (GUI) of the LCNC development platform to drag and drop components of the integration flow 336.

Figure 6:
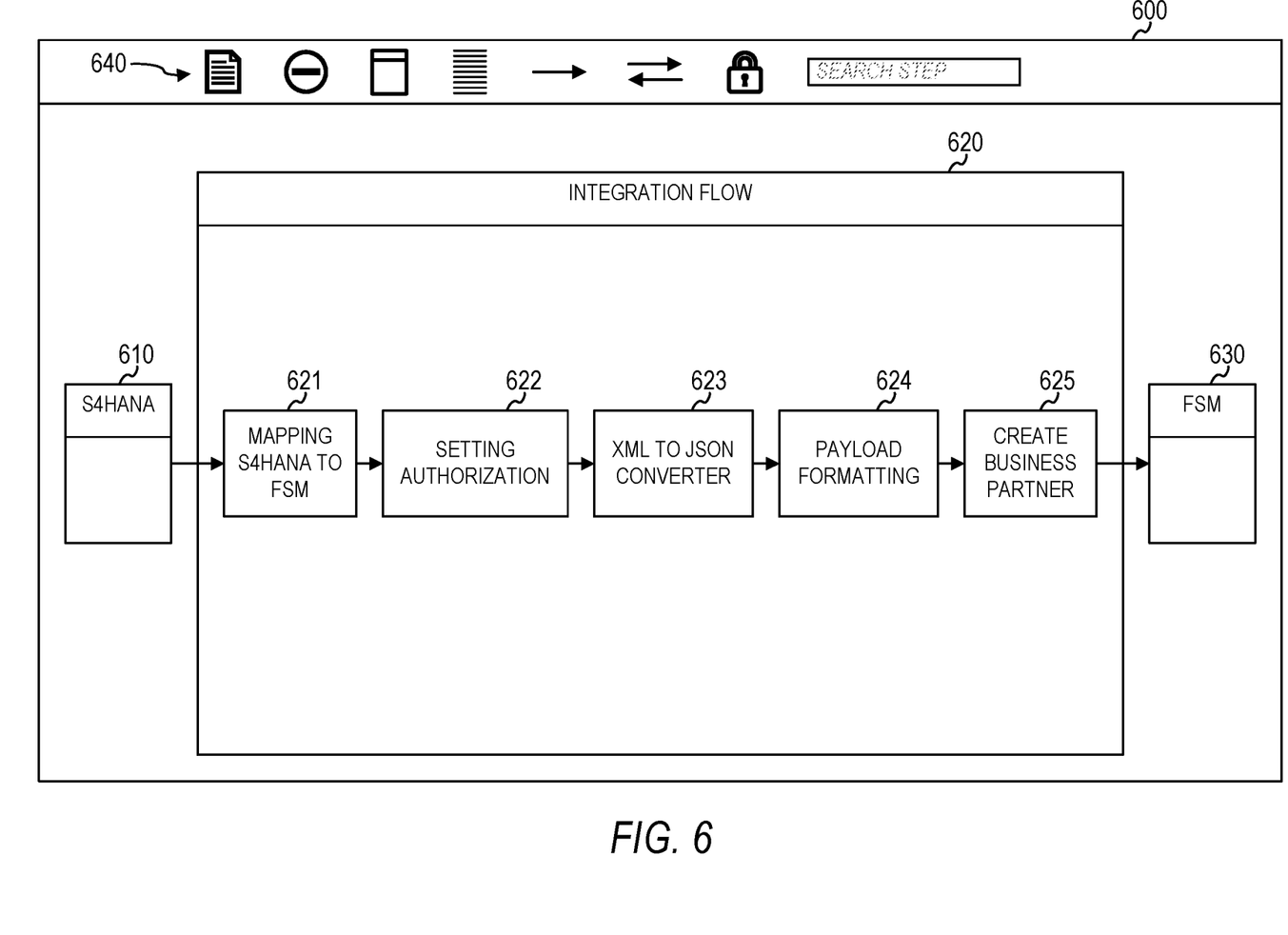
FIG. 6 illustrates an example GUI of a low-code no-code (LCNC) development platform.

FIG. 6 illustrates an example GUI 600 of a low-code no-code (LCNC) development platform. The GUI 600 of the LCNC development platform may provide a modeling environment that enables a user to design details of message processing, such as messaging endpoints (e.g., a sender and a receiver) and individual processing steps between the messaging endpoints. In FIG. 6, the integration developer has used the LCNC development platform to create endpoints 610 and 630 and components 621, 622, 623, 624, and 625 of an integration flow 620. For example, the integration flow 620 may be configured to enable communication between the endpoint 610, such as the first application 312, and the endpoint 630, such as the second application 322.

In some example embodiments, the integration development component 332 is configured to receive a configuration of the integration flow from the computing device 350 of the integration developer via the LCNC development platform. The integration flow is configured to enable communication between the first application 312 being hosted on the first system 310 and the second application 322 being hosted on the second system 320.

In some example embodiments, the integration development component 332 is configured to build a container image of the integration flow based on the configuration of the integration flow. The container image is configured to execute the integration flow. In some example embodiments, the building of the container image of the integration flow comprises generating a Java Archive (JAR) file that includes the container image of the integration flow.

In some example embodiments, the development platform 330 is configured to deploy the container image of the integration flow 336 on the second system 320. The deployed container image of the integration flow 336 enables communication between the first application 312 and the second application 322. The system architecture 300 may comprise an identity and access management component 334 (e.g., incorporated into the development platform 330) that is configured to control access to the second system 320. For example, the identity and access management component 334 may be configured to control access by the first application 312 to the integration flow 336 deployed on the second system 320, as well as to the second application 322 on the second system 320.

Figure 7:
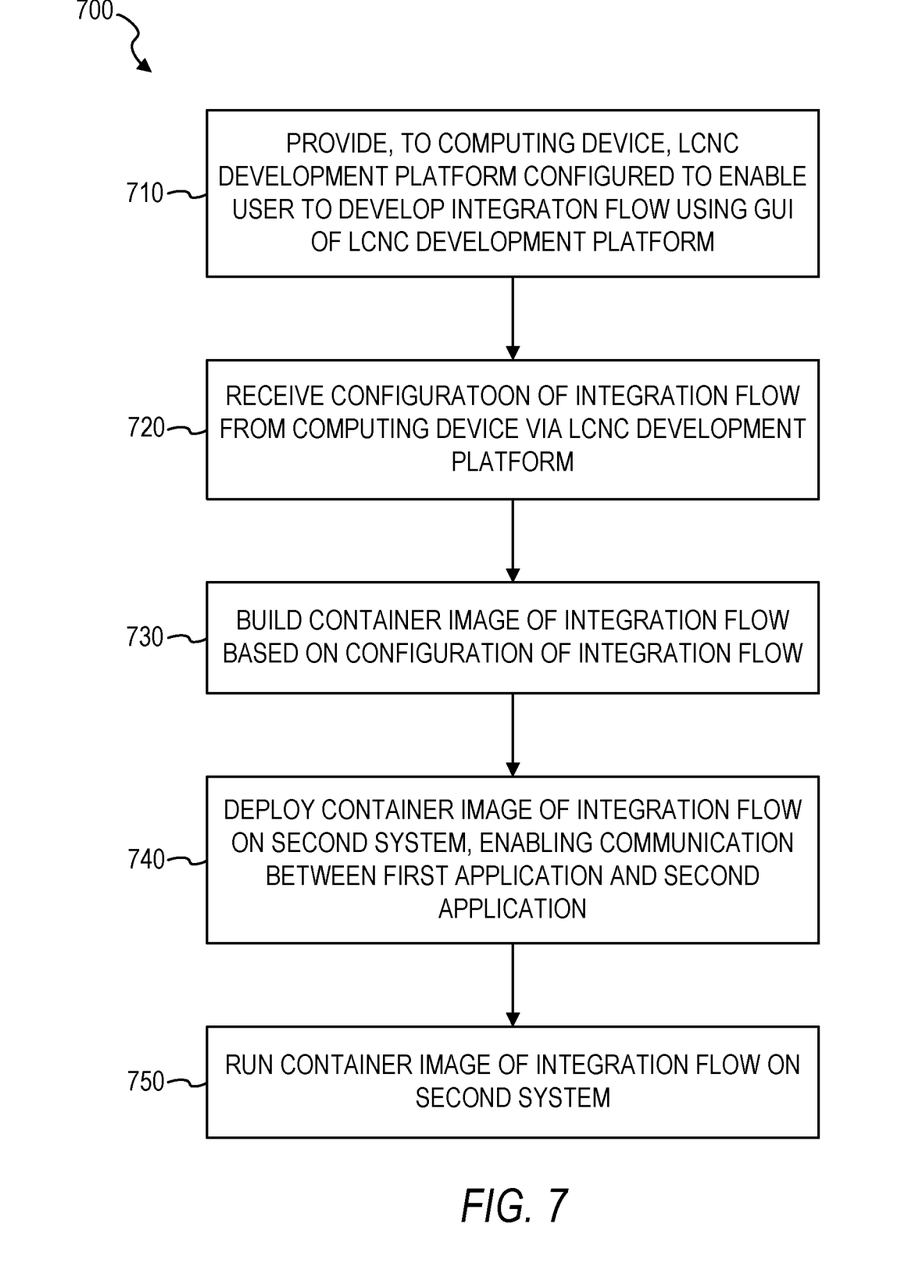
FIG. 7 is a flowchart illustrating an example method of integrating a first application and a second application.

FIG. 7 is a flowchart illustrating an example method of integrating an on-premise application and a cloud application. The method 700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 700 are performed by the system architecture 300 of FIG. 3 or any combination of one or more of its components (e.g., the development platform 330).

At operation 710, the system architecture 300 provides a low-code no-code (LCNC) development platform to a computing device, such as the computing device 350. In some example embodiments, the LCNC development platform is configured to enable a user of the computing device to develop an integration flow 336 by using a graphical user interface (GUI) of the LCNC development platform to drag and drop components of the integration flow. For example, the development platform 330 may provide the LCNC development platform of the integration development component 332 discussed above with respect to FIG. 3.

Next, the system architecture 300 may receive a configuration of the integration flow 336 from the computing device 350 via the LCNC development platform, at operation 720. For example, a user of the computing device 350 may use the GUI 600 discussed above with respect to FIG. 6 to develop the configuration of the integration flow 336. The configuration may comprise details of the integration flow 336, such as messaging endpoints (e.g., a sender and a receiver) and individual processing steps between the messaging endpoints. In some example embodiments, the integration flow 336 is configured to enable communication between an first application 312 being hosted on an first system 310 and a second application 322 being hosted on a second system 320. In some example embodiments, the first application 312 comprises an on-premise application that is hosted on an on-premise system, and the second application 322 comprises a cloud application that is hosted on a cloud system. However, the first application 312 may alternatively comprise a cloud application that is hosted on a cloud system. Furthermore, the second application 322 may alternatively comprise an on-premise application that is hosted on an on-premise system.

The first system 310 may have a first data model and the second system 320 may have a second data model that is different from the first data model. The first application 312 may comprise an enterprise resource planning (ERP) application. However, the first application 312 may comprise other types of software applications as well. The second application 322 may comprise a field service management (FSM) application. However, the second application 322 may comprise other types of software applications as well.

Then, at operation 730, the system architecture 300 may build a container image of the integration flow 336 based on the configuration of the integration flow 336. In some example embodiments, the container image is configured to execute the integration flow 336. The container image of the integration flow 336 may comprise a lightweight, stand-alone, executable package of software that includes everything needed to run the integration flow, such as code, runtime, system tools, system libraries, and settings. The building the container image of the integration flow 336 may comprise generating a Java Archive (JAR) file that includes the container image of the integration flow 336.

At operation 740, the system architecture 300 deploys the container image of the integration flow 336 on the second system 320. In some example embodiments, the deployed container image of the integration flow 336 enables communication between the first application 312 and the second application 322. For example, the deployment of the container image of the integration flow 336 makes the integration flow 336 available for use by the second system 320 in processing requests from the first application 312 to the second application 322.

The system architecture 300 may then run the container image of the integration flow 336 on the second system 320, at operation 750. For example, the second system 320 may use the deployed container image of the integration flow 336 to process requests from the first application 312 to the second application 322.

It is contemplated that any of the other features described within the present disclosure can be incorporated into the method 700.

Figure 8:
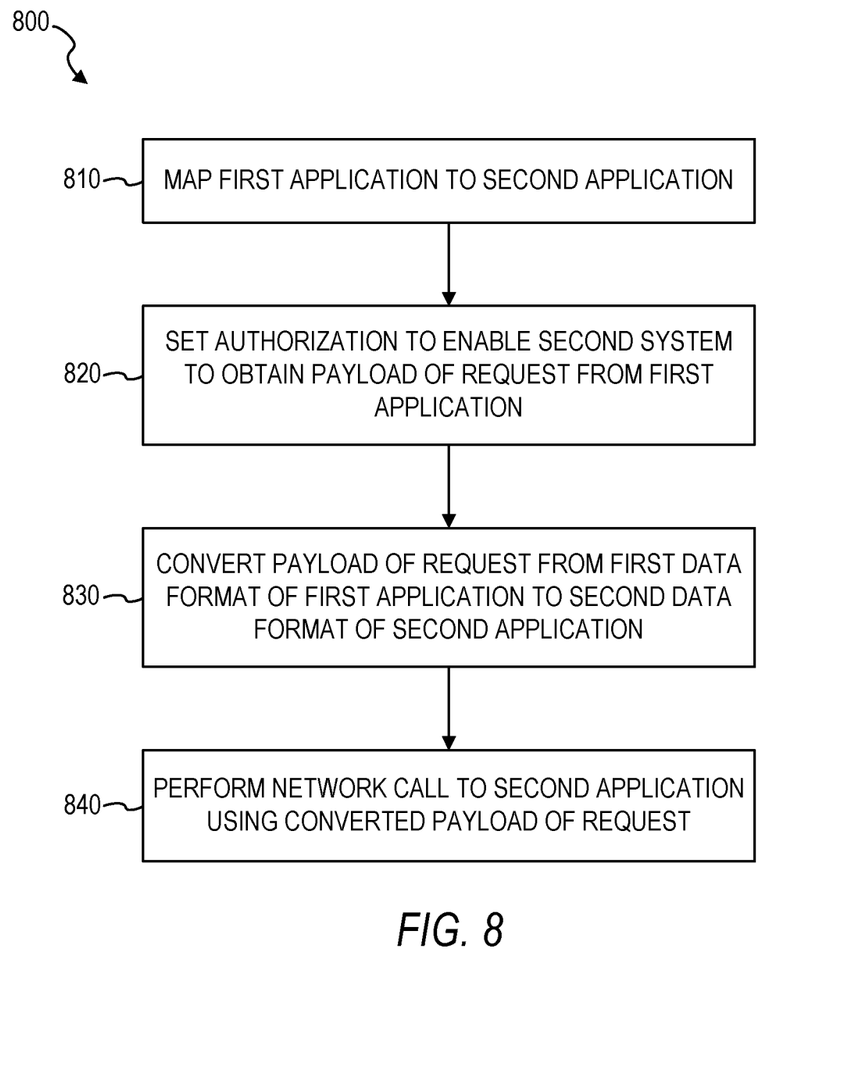
FIG. 8 is a flowchart illustrating an example method 800 of running a container image of an integration flow.

FIG. 8 is a flowchart illustrating an example method 800 of running a container image of an integration flow. For example, the method 800 may comprise the integration flow 336 of which a container image is built by the development platform 330 and deployed on the second system 320, which may also comprise the same integration flow 336. The method 800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 800 are performed by the second system 320 of FIG. 3.

At operation 810, the second system 320 maps the first application 312 to the second application 322. For example, the second system 320 may obtain a database schema of the first system 310 and a database schema of the second system 320, and then generate a data mapping specification for transforming attributes of the first system 310 to the second system 320 based on the database schema of the first system 310 and the database schema of the second system 320. The data mapping specification may comprise a list of attributes for the first system 310, a corresponding mapped list of attributes for the second system 320, and translation rules defining any data manipulation that needs to happen as information moves between the first system 310 and the second system 320, such as setting default values, combining fields, or mapping values.

The second system 320 may, at operation 820, set an authorization to enable the second system 320 to obtain a payload of a request from the first application 312. Authorization may be needed for any APIs of the first system 310 or of the second system 320 to provide data. In some example embodiments, the second system 320 may set authorization headers that are specific for certain API calls. Each authorization header may comprise credentials to authenticate a user agent with a server.

Next, the second system 320 may convert the payload of the request from a first data format of the first application 312 to a second data format of the second application 322, at operation 830. In one example, the first data format of the first system 310 is XML and the second data format of the cloud system is JSON, and the second system 320 may convert the payload of the request from the first application 312 from XML into JSON. The second system 320 may also format the payload of the request in other ways as well.

Then, at operation 840, the second system 320 may perform a network call to the second application 322 using the converted payload of the request. For example, the second system 320 may send the converted payload to the second application 322 as an HTTP API call.

It is contemplated that any of the other features described within the present disclosure can be incorporated into the method 800.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: providing a low-code no-code (LCNC) development platform to a computing device, the LCNC development platform being configured to enable a user of the computing device to develop an integration flow by using a graphical user interface (GUI) of the LCNC development platform to drag and drop components of the integration flow; receiving a configuration of the integration flow from the computing device via the LCNC development platform, the integration flow being configured to enable communication between a first application being hosted on a first system and a second application being hosted on a second system; building a container image of the integration flow based on the configuration of the integration flow, the container image being configured to execute the integration flow; and deploying the container image of the integration flow on the second system, the deployed container image of the integration flow enabling communication between the first application and the second application.

Example 2 includes the computer-implemented method of example 1, wherein the first system has a first data model and the second system has a second data model that is different from the first data model.

Example 3 includes the computer-implemented method of example 1 or example 2, wherein the building the container image of the integration flow comprises generating a Java Archive (JAR) file.

Example 4 includes the computer-implemented method of example 1 or example 3, wherein the first application comprises an enterprise resource planning (ERP) application.

Example 5 includes the computer-implemented method of any one of examples 1 to 4, wherein the second application comprises a field service management (FSM) application.

Example 6 includes the computer-implemented method of any one of examples 1 to 5, further comprising running the container image of the integration flow on the second system.

Example 7 includes the computer-implemented method of any one of examples 1 to 6, wherein the running the container image of the integration flow comprises: mapping the first application to the second application; setting an authorization to enable the second system to obtain a payload of a request from the first application; converting the payload of the request from a first data format of the first application to a second data format of the second application; and performing a network call to the second application using the converted payload of the request.

Example 8 includes the computer-implemented method of any one of examples 1 to 7, wherein the first application comprises an on-premise application that is hosted on an on-premise system, and the second application comprises a cloud application that is hosted on a cloud system.

Example 9 includes the computer-implemented method of any one of examples 1 to 8, wherein the first application comprises a first on-premise application that is hosted on a first on-premise system, and the second application comprises a second on-premise application that is hosted on a second on-premise system.

Example 10 includes the computer-implemented method of any one of examples 1 to 9, wherein the first application comprises a first cloud application that is hosted on a first cloud system, and the second application comprises a second cloud application that is hosted on a second cloud system.

Example 11 includes a system comprising: at least one processor; and a non-transitory computer-readable medium storing executable instructions that, when executed, cause the at least one processor to perform the method of any one of examples 1 to 10.

Example 12 includes a non-transitory machine-readable storage medium, tangibly embodying a set of instructions that, when executed by at least one processor, causes the at least one processor to perform the method of any one of examples 1 to 10.

Example 13 includes a machine-readable medium carrying a set of instructions that, when executed by at least one processor, causes the at least one processor to carry out the method of any one of examples 1 to 10.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
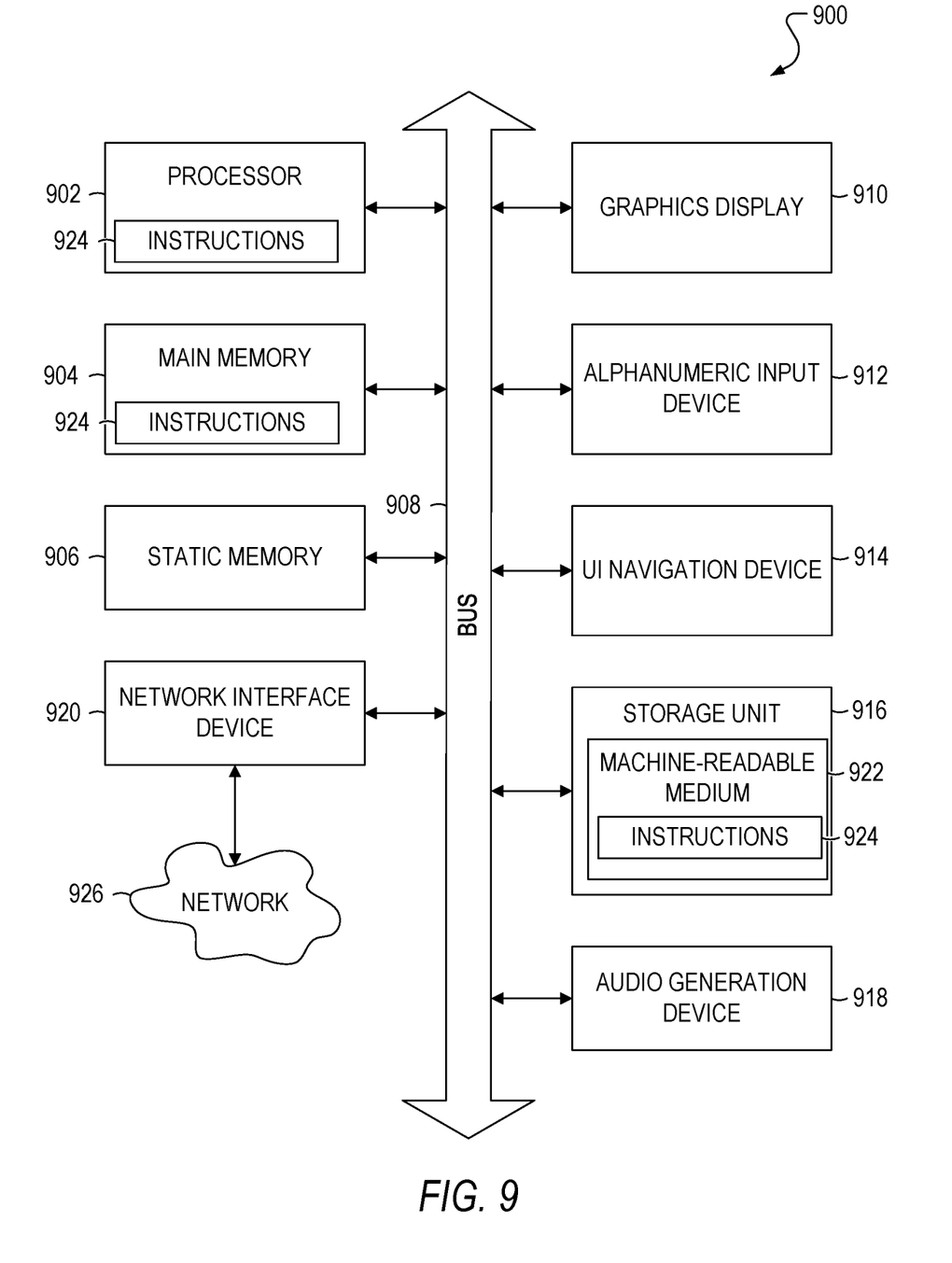
FIG. 9 is a block diagram of an example computer system on which methodologies described herein can be executed.

FIG. 9 is a block diagram of a machine in the example form of a computer system 900 within which instructions 924 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a graphics or video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a storage unit (e.g., a disk drive unit) 916, an audio or signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system of comprising:
   at least one hardware processor; and
   a non-transitory computer-readable medium storing executable instructions that, when executed, cause the at least one hardware processor to perform operations comprising:
   providing a low-code no-code (LCNC) development platform to a computing device, the LCNC development platform being configured to enable a user of the computing device to develop an integration flow by using a graphical user interface (GUI) of the LCNC development platform to drag and drop components of the integration flow;
   receiving a configuration of the integration flow from the computing device via the LCNC development platform, the integration flow being configured to enable communication between a first application being hosted on a first system and a second application being hosted on a second system;
   building a container image of the integration flow based on the configuration of the integration flow, the container image being configured to execute the integration flow;
   deploying the container image of the integration flow on the second system, the deployed container image of the integration flow enabling communication between the first application and the second application; and
   running the container image of the integration flow on the second system, the running of the container image of the integration flow comprising:
   mapping the first application to the second application;
   setting an authorization to enable the second system to obtain a payload of a request from the first application;
   converting the payload of the request, from the first application, from a first data format of the first application to a second data format of the second application; and
   performing a network call to the second application using the converted payload of the request.

2. The system of claim 1, wherein the first system has a first data model and the second system has a second data model that is different from the first data model.

3. The system of claim 1, wherein the building the container image of the integration flow comprises generating a Java Archive (JAR) file.

4. The system of claim 1, wherein the first application comprises an on-premise application being hosted on an on-premise system and the second application comprises a cloud application being hosted on a cloud system.

5. The system of claim 1, wherein the first application comprises a first on-premise application being hosted on a first on-premise system and the second application comprises a second on-premise application being hosted on a second on-premise system.

6. The system of claim 1, wherein the first application comprises a first cloud application being hosted on a first cloud system and the second application comprises a second cloud application being hosted on a second cloud system.

7. A computer-implemented method performed by a computer system having a memory and at least one hardware processor, the computer-implemented method comprising:
providing a low-code no-code (LCNC) development platform to a computing device, the LCNC development platform being configured to enable a user of the computing device to develop an integration flow by using a graphical user interface (GUI) of the LCNC development platform to drag and drop components of the integration flow;
receiving a configuration of the integration flow from the computing device via the LCNC development platform, the integration flow being configured to enable communication between a first application being hosted on a first system and a second application being hosted on a second system;
building a container image of the integration flow based on the configuration of the integration flow, the container image being configured to execute the integration flow;
deploying the container image of the integration flow on the second system, the deployed container image of the integration flow enabling communication between the first application and the second application; and
running the container image of the integration flow on the second system, the running of the container image of the integration flow comprising:
mapping the first application to the second application;
setting an authorization to enable the second system to obtain a payload of a request from the first application;
converting the payload of the request, from the first application, from a first data format of the first application to a second data format of the second application; and
performing a network call to the second application using the converted payload of the request.

8. The computer-implemented method of claim 7, wherein the first system has a first data model and the second system has a second data model that is different from the first data model.

9. The computer-implemented method of claim 7, wherein the building the container image of the integration flow comprises generating a Java Archive (JAR) file.

10. The computer-implemented method of claim 7, wherein the first application comprises an on-premise application being hosted on an on-premise system and the second application comprises a cloud application being hosted on a cloud system.

11. The computer-implemented method of claim 7, wherein the first application comprises a first on-premise application being hosted on a first on-premise system and the second application comprises a second on-premise application being hosted on a second on-premise system.

12. The computer-implemented method of claim 7, wherein the first application comprises a first cloud application being hosted on a first cloud system and the second application comprises a second cloud application being hosted on a second cloud system.

13. A non-transitory machine-readable storage medium tangibly embodying a set of instructions that, when executed by at least one hardware processor, causes the at least one hardware processor to perform operations comprising:
providing a low-code no-code (LCNC) development platform to a computing device, the LCNC development platform being configured to enable a user of the computing device to develop an integration flow by using a graphical user interface (GUI) of the LCNC development platform to drag and drop components of the integration flow;
receiving a configuration of the integration flow from the computing device via the LCNC development platform, the integration flow being configured to enable communication between a first application being hosted on a first system and a second application being hosted on a second system;
building a container image of the integration flow based on the configuration of the integration flow, the container image being configured to execute the integration flow;
deploying the container image of the integration flow on the second system, the deployed container image of the integration flow enabling communication between the first application and the second application; and
running the container image of the integration flow on the second system, the running of the container image of the integration flow comprising:
mapping the first application to the second application;
setting an authorization to enable the second system to obtain a payload of a request from the first application;
converting the payload of the request, from the first application, from a first data format of the first application to a second data format of the second application; and
performing a network call to the second application using the converted payload of the request.

14. The non-transitory machine-readable storage medium of claim 13, wherein the first system has a first data model and the second system has a second data model that is different from the first data model.

15. The non-transitory machine-readable storage medium of claim 13, wherein the building the container image of the integration flow comprises generating a Java Archive (JAR) file.

16. The non-transitory machine-readable storage medium of claim 13, wherein the first application comprises an on-premise application being hosted on an on-premise system and the second application comprises a cloud application being hosted on a cloud system.

17. The non-transitory machine-readable storage medium of claim 13, wherein the first application comprises a first on-premise application being hosted on a first on-premise system and the second application comprises a second on-premise application being hosted on a second on-premise system.

18. The non-transitory machine-readable storage medium of claim 13, wherein the first application comprises a first cloud application being hosted on a first cloud system and the second application comprises a second cloud application being hosted on a second cloud system.

* * * * *